Figure 1:
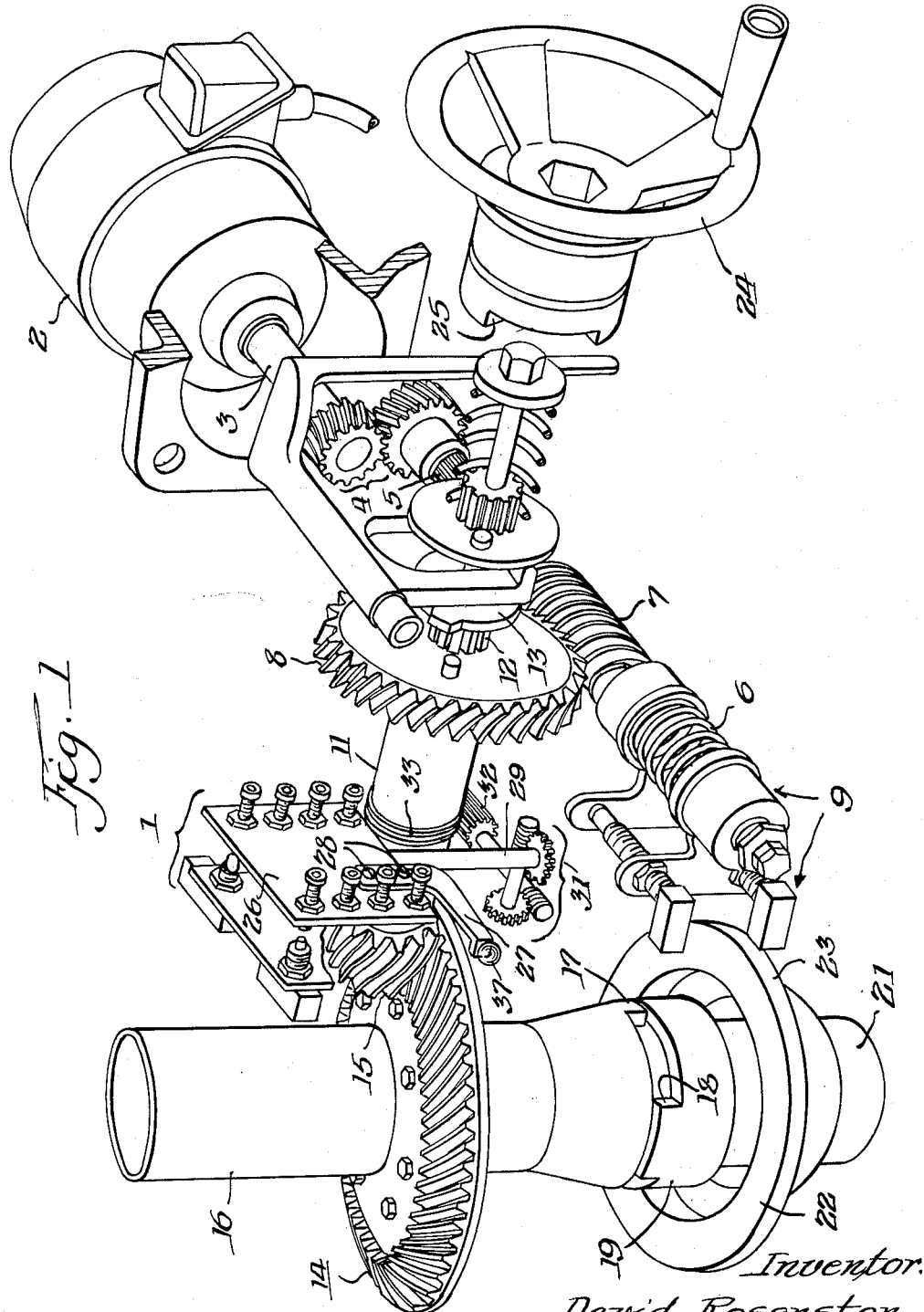

March 8, 1966  D. ROSENSTON  3,239,616
VALVE INDICATOR AND LIMIT SWITCH COMBINATION
Filed May 5, 1964  3 Sheets-Sheet 1

Inventor.
David Rosenston.
By Joseph O. Lange
Atty.

March 8, 1966  D. ROSENSTON  3,239,616
VALVE INDICATOR AND LIMIT SWITCH COMBINATION
Filed May 5, 1964  3 Sheets-Sheet 2

Inventor:
David Rosenston.
By Joseph O. Lange
Atty.

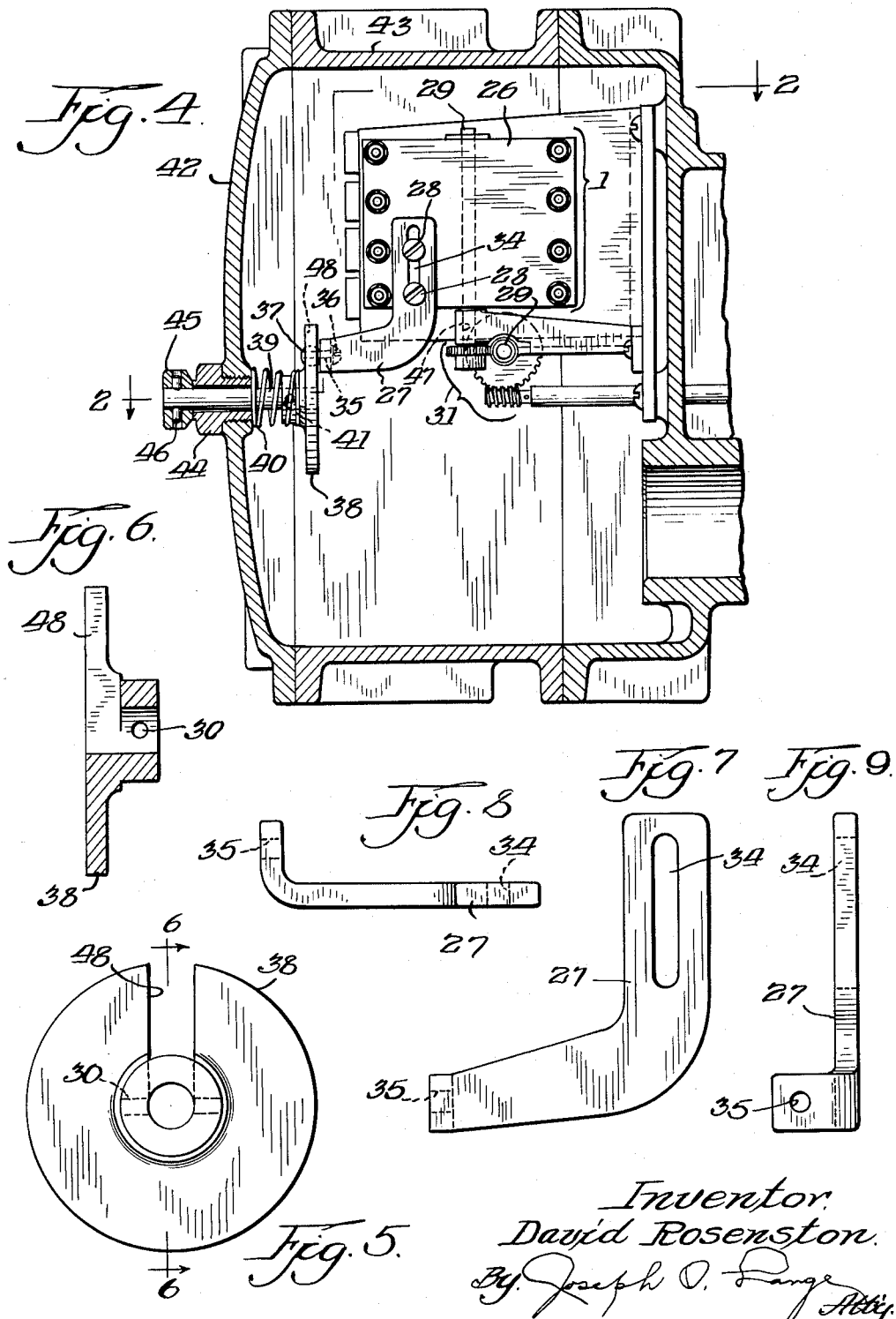

United States Patent Office 3,239,616
Patented Mar. 8, 1966

3,239,616
VALVE INDICATOR AND LIMIT SWITCH COMBINATION
David Rosenston, Chicago, Ill., assignor to Crane Co., Chicago, Ill., a corporation of Illinois
Filed May 5, 1964, Ser. No. 364,906
7 Claims. (Cl. 200—47)

This invention relates generally to a valve position indicator. More particularly, it is concerned with a novel type of indicator having particular application to a motor driven valve actuating means, but which can also be used with such actuating means when manual means of operation, such as handwheel, is employed.

At the outset, in order to have a better appreciation of the merits of this invention, it should be understood that there has long existed a need for providing a relatively simple and economical indicator mechanism for collaboration with valve actuating means, such as the type for example, identified by the pending patent application identified as Serial No. 148,423, filed October 30, 1961, and entitled Valve Operating Mechanism. The importance of this invention is especially apparent when it is realized that codes and other specifications call for suitable valve position indicating mechanisms.

It is therefore one of the important objects of this invention to provide a valve indicator comprising essentially a pointer and shaft assembly for use with either a motor operator or manual means.

Another object is to provide a synchronized valve position indicator which is easily adjustable and which need not be disassembled in the event of removal of the cover or housing upon which said indicator mechanism is mounted when limit switch adjustments are necessary.

Another important object is to provide for a valve position indicator mechanism in which it is relatively convenient to interpose a suitable gearing between the cam and pointer shaft as hereinafter explained in greater detail, satisfying the requirement for the type of an indicator dial which if desired is movable throughout a range exceeding 90 degrees when the requirement for such performance becomes necessary.

A further important object of this invention is to provide for a simple mechanical valve position indicator as a substitute for the more expensive and elaborate electrical lamps or slide wires frequently employed in the past and which require special attention in both assembly as well as in subsequent maintenance.

Another important object is to provide for a valve position indicator which is readily adaptable and easily adjustable for the desired number of turns as determined by the valve actuating mechanism such as the yoke sleeve and stem.

A still further important object is to provide for a valve position indicator which is rendered more economical from a production standpoint in that a single design suitable for all sizes of operators and for all types of valves, whether gate valves, globe valves, and the like may be provided.

A further important object is to provide for a valve position indicator mechanism utilizing a rocker plate of a geared limit switch so employed as to provide the desired accurate position indication while avoiding a complicated mechanism.

A further important object is to provide for a valve position indicator in which its simplicity in construction is of such order as to permit a mounting to a motor- or manually-operated valve in the field if such requirement becomes necessary.

Figure 2:
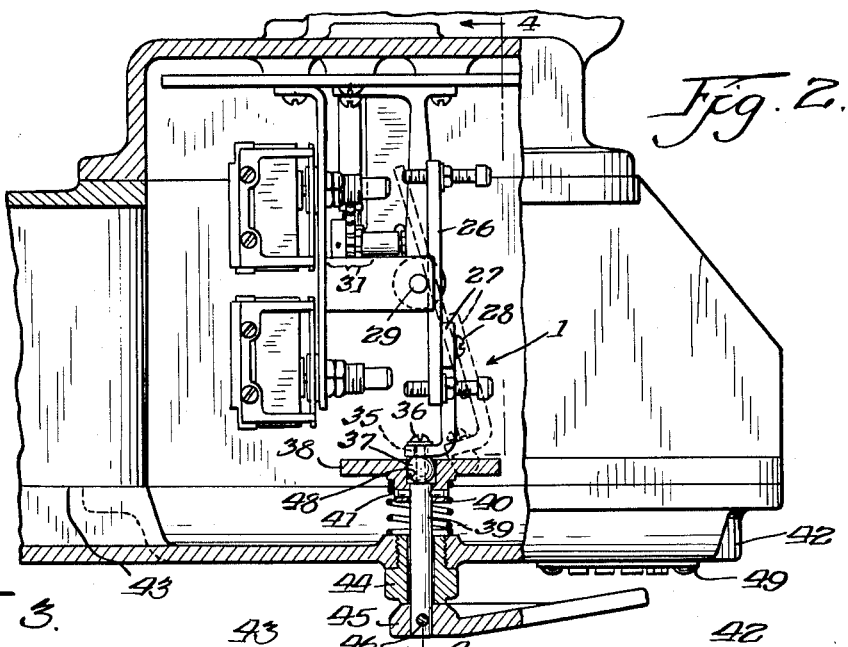
Figure 3:
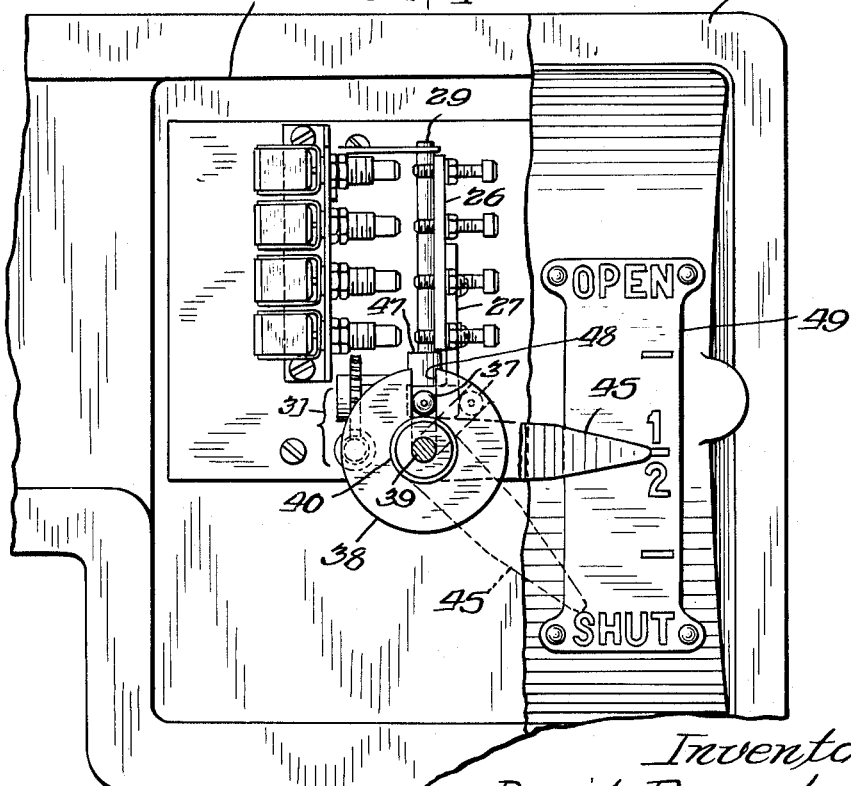

Other objects and advantages will become more readily apparent upon proceeding with the following description read in light of the accompanying drawings, in which:

FIG. 1 is a perspective view, partly diagrammatical and partly exploded, showing a valve operating mechanism with which this invention is employed;
FIG. 2 is a transverse sectional view taken on the line 2—2 of FIG. 4;
FIG. 3 is a front elevational view of the construction shown in FIG. 2;
FIG. 4 is a side transverse sectional view of the construction shown approximately on line 4—4 of FIG. 2;
FIG. 5 is a plan view of the indicator cam of my invention;
FIG. 6 is a sectional view taken on the line 6—6 of FIG. 5;
FIG. 7 is a plan view of the indicator arm of this invention;
FIG. 8 is an end view of the indicator arm shown in FIG. 7; and
FIG. 9 is a front elevation of the indicator arm referred to in FIGS. 7 and 8.

Similar reference numerals refer to similar parts throughout the several views.

In order to have a general understanding of a preferred form of the application of the valve position indicator of this invention, attention is directed at the outset to one type of a well-known valve actuating mechanism shown in FIG. 1. In this view, a geared position limit switch generally designated 1 is shown whose function by previous setting is to be in synchronism with the yoke sleeve rotation of a valve (not shown) and actuates a bank of electrical switches which are normally wired to provide predetermined control of current to the electric motor 2 and open and close indicator lights (not shown) and interlocks.

The motor 2 by means of an output shaft 3 drives through a helical gear set designated 4 to drive the splined worm shaft 5, the latter being axially movable biased against the torque spring 6, the worm portion 7 engaging the worm gear 8 as shown.

It will be appreciated that the axial movement of the worm shaft 5 will cause the actuation of the torque switches 9 and control in making or breaking the electrical contact.

The worm gear 8 is splined as at 12 for cooperation with the clutch 13. The spiral bevel gear 14 meshes with the pinion gear 15 on the clutch shaft 11. The spiral bevel gear 14 is attached to the drive shaft 16 as shown, having at its lower portion annularly spaced-apart driving lugs 17 mounted in clutch gripping arrangement to cooperate with the annularly spaced-apart clutch portion 18. Such arrangement provides the means to drive the unit adapter 19 such as the type illustrated in U.S. Patent No. 3,115,787, granted December 31, 1963. As noted in said patent, this construction provides for suitable engagement with a valve yoke sleeve (not shown) by means of the yoke adapter 22. The lower flange portion 21 is integral with the said valve yoke adapter and abuts the top of the yoke hub not shown, but which is illustrated in the said patent and is bolted thereon.

The yoke adapter 22 is provided with an outwardly extending flange as indicated at 23 and bolted to the gear housing (not shown) of the actuating mechanism for effecting the attachment of the latter to the valve.

It will be appreciated that a hammerblow mechanism is preferably provided by means of the connection between portions 17 and 18 between the yoke sleeve of the valve and the valve operating mechanism to permit the motor to obtain full speed before actual driving load is applied.

It will also be apparent that by reason of the said axial arrangement of the worm 7, a torque control is accomplished with the torque spring 6 and when the adjusted preload on the spring is reached due to the applied torque in seating the valve the shaft 5 with the worm 7 will move axially against the spring whereby to actuate the torque switches 9 thereby to open the motor circuit.

Referring to the clutch mechanism hereinabove described, it will be appreciated that such mechanism includes provision for the manual disengagement of the motor and the engagement of the handwheel 24. It will be apparent that when the motor is energized, the clutch will automatically disengage the handwheel 2 as indicated diagrammatically at 25. When the clutch is engaged for manual operation, it will be apparent that the handwheel is then directly connected to the primary set of spiral bevel gears as at 14 and 15. It will be appreciated that by virtue of the construction hereinabove described, the valve stem speed can be varied over a wide range and selectively interchangeable torque springs may be used with the unit desired so that the torque output can be adjusted to meet the varied service requirements of the valve in the field.

The above description provides in general for the driving mechanism set forth in the patent application referred to and establishes the background of one form of the application of this invention to valve actuators.

Referring now to said particular use of this invention, it will be noted that attached to the rocker plate 26 of the geared limit switch 1 there is provided the indicator arm 27. The latter member is attached at 28 to the rocker plate 26. It should be understood that the rocker plate 26 is tiltable in its movement when viewed in plan as shown in FIG. 2. It has been found desirable to provide for a range of tiltable movement of said rocker plate (indicated by dotted lines) between 15 and 30 degrees. Such tiltability in movement is accomplished by suitable rotation of the shaft 29. The latter at its lower end portion has the gearing generally designated 31 driven by the pinion gear 32 in meshed arrangement with the clutch shaft 11 at 33 as shown.

Referring now to the mechanism and arrangement of elements which constitute the essentials of this invention, attention is directed to the indicator arm 27 which as previously stated is fixedly attached to the rocker plate 26 of the geared position limit switch 1 as shown in FIG. 1. It should be noted that the means of attachment at 28 includes the provision for a slotted aperture 34 as shown more clearly in FIGS. 7 to 9 inclusive whereby the vertical positioning of the arms 27 is finally adjusted by the predetermined location of the attaching means 28 within said slot as more clearly shown in FIG. 4.

At the outer end portion of the indicator arm 27, a relieved portion or aperture 35 is provided therein for receiving the attachment means such as machine screw 36. The latter member secures the ball member 37 which fits over and closes the aperture 35 as shown. The ball member 37 provides the means by which the actual engagement, as hereinafter explained, is made with the indicator cam 38. The latter member is fixedly attached to the indicator shaft 39 and is mounted thereon in non-rotatable relation by means of the pin 41 applied in the aperture 30.

A housing cover 42 for the housing 43 encloses the limit switch gearing and shaft previously referred to. The said cover serves as the journalling means for the shaft 39 preferably employing the threaded indicator bushing member 44 through which the said shaft extends as more clearly shown in FIG. 4. Upon the outer end portion of the shaft 39, the indicator pointer 45 is carried which is pinned as at 46 to the said shaft.

Referring now to the geared position limit switch 1 as shown in FIGS. 3 and 4 and more specifically to the rocker plate 26 tiltably mounted thereon, it will be understood that the shaft 29 journalled as at 47 by its rotation imparts said tilting movement to the rocker plate 26 by virtue of the reduction gearing generally designated 31. The direction of rotation of said shaft is dependent upon the position of the valve whether open, closed, or throttling. Assume that the indicator arm 27 has been adjusted vertically with relation to the engagement of rotatable cam 38. The ball member 37 then engages the slotted or relieved portion 48 of the said cam member.

Further, assuming that a predetermined tilting movement of the rocker plate 26 on the limit switch 1 has taken place, the indicator arm 27 will likewise move transversely in accordance with the tilting movement of the rocker plate 26. This causes the cam member 38 to be rotated by reason of the engagement of the ball 37 with the slot or relieved portion 48. The shaft 39 is then similarly rotated in a direction likewise depending upon the tilting movement initiated by the rocker plate 26.

As shown more clearly in FIG. 3 in which a portion of the cover 42 has been removed, the pointer 45 will assume the position indicated in the dotted lines, such position depending upon the amount or degree and the direction of the movement of the tilting rocker plate 26.

As shown in FIGS. 2 and 3, a suitable indicator plate 49 is attached to the cover 42 preferably having the letter configurations "OPEN" and "SHUT" as indicated and with the throttled or half-open position being indicated preferably midway therebetween.

Preferably for purpose of assuring a stable mounting of the rotatable cam 38 in relation to the shaft bearing of the member 39, suitable resilient means such as the coil spring 40 may be used which at the same time assists in maintaining the assembly between the cam and the indicator arm in the desired position.

Details of the limit switches have been intentionally omitted since these members follow the usual pattern employed for this purpose and are of the well-known type manufactured by electrical supply manufacturers as stock items.

Likewise, the arrangement of the gearing as indicated at 31, 32, and 33 is similarly referred to in FIG. 1 in a general way because the manner in which the tiltable movement is imparted to the rocker plate 26 is not of particular significance insofar as the invention is concerned. In the use of valve position indicator, all that is desired is to effect by suitable means the tilting movement of the member 26.

Similarly, the drawing and description in their reference to the valve operating mechanisms, such as the motor drive 2 or the manual operation as indicated at the handwheel 24, are primarily diagrammatic in their character. Therefore, it will be appreciated that the manner in which rotation is imparted to the clutch shaft 11 may vary quite substantially from that shown and described and yet remain within the spirit of this invention.

Also the means for applying the adapter 21 to the coupling portions connecting the motor or manual drive to the valve (not shown) is primarily diagrammatic because the details are shown adequately in the adapter patent referred.

Further, it should be noted that while indications are that the valve herein referred to is of a rising stem type, it must of course be appreciated that this type designation is of no special moment insofar as the specific application of this invention is concerned. Non-rising valve stem drives may be similarly furnished with the indicator mechanism of this invention without substantial departure.

While only a single embodiment has been shown and described, it will be appreciated that this is done for purpose of illustration only and in nowise should be construed as effecting limitations upon the interpretation of the claims which follow.

I claim:
1. In a valve position indicator and limit switch combination for a valve actuator, shaft and gear means for the actuator, a geared position limit switch of said valve actuator cooperating with said shaft and gear means, said limit switch including a tiltable rocker plate and shaft for said rocker plate and rocker plate gear means for pivotally moving said rocker plate during operation of the valve actuation, the valve position indicator comprising an indicator arm mounted on said rocker plate for actuating said valve position indicator, a housing for enclosing said limit switch and for supporting said valve position indicator, a rotatable cam cooperating with said indicator arm, the said cam receiving one end portion of the indicator arm and being radially relieved to receive said one end portion of the said indicator arm, a rotatable shaft fixed to said rotatable cam and journally projecting through a wall portion of said housing, an indicator pointer attached to an outer end portion of said rotatable shaft whereby upon predetermined rotative movement of said rotatable shaft and cam by said rocker plate said indicator pointer is moved to indicate the valve position, and indicator position means cooperating with said pointer on an outer wall portion of said housing.

2. The subject matter of claim 1, the said indicator arm being adjustably mounted on said rocker plate to permit predetermined transverse positioning of the indicator arm relative to said rocker plate and to the said cam.

3. The subject matter of claim 2, the said rotatable cam and said indicator arm having respective slotted portions, at least in one position of the valve the said slotted portion of the said cam and said one portion of the indicator arm being substantially parallel.

4. In a valve position indicator for a motor driven valve actuator, the combination of a motor, a driven shaft therefor, gearing cooperating with said driven shaft, a second shaft driven by said gearing, a geared position limit switch actuated by said second shaft, the said limit switch having a rocker plate pivotally cooperating therewith, means between said second shaft and said switch for actuating said rocker plate, an indicator arm mounted on said rocker plate, a housing for said limit switch, a rotatable shaft projecting through a cover portion of said housing, a cam fixed to said shaft cooperating with said indicator arm, said rotatable shaft having an indicator pointer, an indicator position plate mounted on an exterior surface of said housing cover portion, said rotatable cam being radially slotted to receive one end portion of the said indicator arm whereby to move said indicator pointer arcuately to indicate the valve position upon predetermined pivotal movement of said rocker plate of the said limit switch.

5. The subject matter of claim 4, the said second shaft being rotatable limitedly in response to the movement of the valve actuator, the said rocker plate being tiltably movable limitedly on said second shaft whereby upon predetermined rotation of said second shaft said rocker plate is tiltably movable in a plane substantially transverse to the plane of movement of said indicator arm and pointer.

6. The subject matter of claim 4, the said indicator arm being of substantially angular configuration with an end leg portion thereof formed to be movable within the radial slot of said rotatable cam upon predetermined movement of said rocker plate.

7. The subject matter of claim 6, a ball member interposed between said rotatable cam and said indicator arm to engage said radial slot of said cam whereby to minimize frictional contact therebetween upon the occurrence of said movement of the rocker plate.

References Cited by the Examiner
UNITED STATES PATENTS

| | | | |
|---|---|---|---|
| 2,415,913 | 2/1947 | Schmidt | 137—556 X |
| 2,480,589 | 8/1949 | McKenney | 200—92 X |
| 2,758,675 | 8/1956 | Callaway | 200—47 X |
| 2,973,412 | 2/1961 | Joseph et al. | 200—47 |
| 3,147,766 | 9/1964 | Herring et al. | 137—536 |

BERNARD A. GILHEANY, *Primary Examiner.*

T. D. MACBLAIN, *Assistant Examiner.*